(12) United States Patent
Zhong

(10) Patent No.: US 10,073,300 B2
(45) Date of Patent: Sep. 11, 2018

(54) DISPLAY PANEL AND DISPLAY DEVICE

(71) Applicant: SHENZHEN CHINA STAR OPTOELECTRONICS TECHNOLOGY CO., LTD., Shenzhen, Guangdong (CN)

(72) Inventor: Xinhui Zhong, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 359 days.

(21) Appl. No.: 14/783,865

(22) PCT Filed: Jul. 29, 2015

(86) PCT No.: PCT/CN2015/085372
§ 371 (c)(1),
(2) Date: Oct. 11, 2015

(87) PCT Pub. No.: WO2016/187948
PCT Pub. Date: Dec. 1, 2016

(65) Prior Publication Data
US 2017/0322459 A1 Nov. 9, 2017

(30) Foreign Application Priority Data

May 27, 2015 (CN) .......................... 2015 1 0277501

(51) Int. Cl.
| G02F 1/1337 | (2006.01) |
| C09K 19/38 | (2006.01) |
| C09K 19/56 | (2006.01) |
| G02F 1/13 | (2006.01) |
| C09K 19/30 | (2006.01) |
| G02F 1/03 | (2006.01) |
| G02F 1/1333 | (2006.01) |

(52) U.S. Cl.
CPC .... *G02F 1/133788* (2013.01); *C09K 19/3028* (2013.01); *C09K 19/3066* (2013.01); *C09K 19/3068* (2013.01); *C09K 19/38* (2013.01); *C09K 19/56* (2013.01); *G02F 1/1303* (2013.01); *G02F 1/1337* (2013.01); *G02F 1/0316* (2013.01); *G02F 2001/133322* (2013.01); *G02F 2001/133742* (2013.01); *Y10T 428/10* (2015.01); *Y10T 428/1005* (2015.01)

(58) Field of Classification Search
CPC .............. G02F 1/1337; G02F 1/13378; G02F 1/133711; G02F 1/1303; G02F 2011/133765; G02F 2011/133322; G02F 2011/133715; C09K 19/56; C09K 19/12; C09K 19/3003; C09K 2019/548; Y10T 428/10; Y10T 428/1005
USPC ....... 428/1.1, 1.2; 349/123, 191; 252/299.01
See application file for complete search history.

(56) References Cited

U.S. PATENT DOCUMENTS

2013/0314655 A1* 11/2013 Archetti ............ C09K 19/3003
349/124

* cited by examiner

*Primary Examiner* — Ruiyun Zhang
(74) *Attorney, Agent, or Firm* — Soroker Agmon Nordman

(57) ABSTRACT

A liquid crystal medium composition is provided with a negative liquid crystal material; at least one polymerizable monomer which is polymerized under a UV irradiation; and at least one alignment assistant including a polar portion and a non-polar portion. The polar portion is connected with the non-polar portion by a bonding group. The liquid crystal medium composition can achieve the vertical alignment without the PI alignment layer by improving the liquid crystal material.

7 Claims, 1 Drawing Sheet

DISPLAY PANEL AND DISPLAY DEVICE

CROSS REFERENCE TO RELATED APPLICATIONS

This application is a U.S. National Phase application submitted under 35 U.S.C. § 371 of Patent Cooperation Treaty Application serial No. PCT/CN2015/085372, filed on Jul. 29, 2015, which claims the priority of China Patent Application serial No. 201510277501.9, filed on May 27, 2015, the disclosures of which are incorporated herein by reference.

FIELD OF THE INVENTION

The present invention relates to display technologies, and more particularly to a liquid crystal medium composition.

BACKGROUND OF THE INVENTION

Currently, the TFT-LCD liquid crystal display on the mainstream market can be divided into three categories, namely, TN (Twisted Nematic) type, STN (Super Twisted Nematic) type, IPS (In-Plane Switching) type and VA (Vertical Alignment) type. The VA type LCD has high contrast relative to other types of LCD, the contrast can be reached 4000-8000, and has a very broad application in large-size display.

The VA type liquid crystal display has liquid crystal molecules arranged perpendicularly to the surface of the substrate without electric field in a dark state, which has no phase difference, low light leakage, low dark-state brightness, thereby having extremely high contrast.

For allowing the liquid crystal molecules in the VA type liquid crystal display panel to be arranged perpendicularly to the surface of the substrate, a vertical alignment needs to be applied to the liquid crystal molecules. As shown in FIG. 1, a liquid crystal display panel comprises a first substrate 10, a second substrate 20, a liquid crystal layer 30. The first substrate 10 has a first transparent electrode layer 11 disposed thereon, the second substrate 20 has a second transparent electrode layer 21 disposed thereon. A vertical alignment agent is coated on the inner sides of the first transparent electrode layer 11 and the second transparent electrode layer 21. The alignment agent generally includes great amount of chemical solvent NMP (N-Methyl pyrrolidone) and polymer such as polyimide (PI), then the two substrates is baked at high temperature (200° C., generally) for a long period, so that the alignment agent is dried to remove the solvent to respectively form a first PI alignment layer 12 on the inner side of the first substrate 10 and a second PI alignment layer 22 on the inner side of the second substrate.

During the process of manufacturing PI, it is necessary to uniformly apply the PI liquid on the surface of the substrate by an ink-jet printing technology, then the substrate is allowed to stand a period of time so that the PI liquid is diffused evenly on the surface of the substrate. Subsequently, the pre-baking step is carried out at a lower temperature (50-150 degrees) for a period of time (1 min to 10 mins), so that a part of the NMP (N-Methyl pyrrolidone) of the PI liquid is partially removed by evaporating to obtain a initially dried PI alignment layer. Then, a baking step is carried out at a high temperature (200-250 degrees) for a long time (30 mins to 120 mins), so that almost all of the solvent is evaporated, and carboxyl and amino groups of the polyamic acid in the PI liquid are fully cyclized to form polyimide. This shows that the manufacturing process of the PI alignment layer is more energy-consumed, not environmentally friend, and easy to cause harm to humans. In addition, due to the problems of uniformity, defect coating, and non-adhesive of the alignment layer, the product yield will be affected to result in a waste of resources, and thus the cost of production is increased.

It is therefore necessary to provide a liquid crystal medium composition to solve the problems existing in the conventional technology as described above.

SUMMARY OF THE INVENTION

An object of the present invention is to provide a liquid crystal medium composition to solve the technical problems of more energy-consumption and higher cost when applying PI alignment layer to the liquid crystal display panel for alignment.

To solve the above problems, the present invention provides a liquid crystal medium composition, comprising: a negative liquid crystal material; at least one polymerizable monomer which is polymerized under a UV irradiation; and at least one alignment assistant including a polar portion and a non-polar portion, wherein the polar portion is connected with the non-polar portion by a bonding group. The alignment assistant has a structure as given in one of the following formulas:

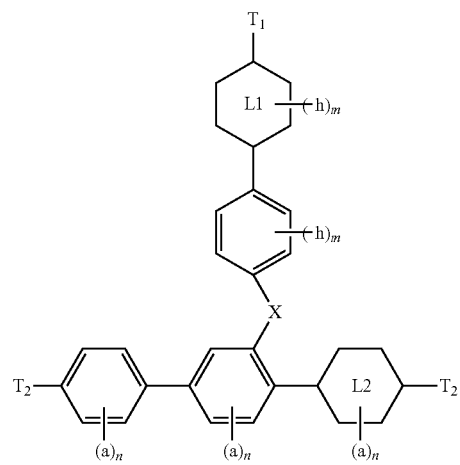

Formula 1

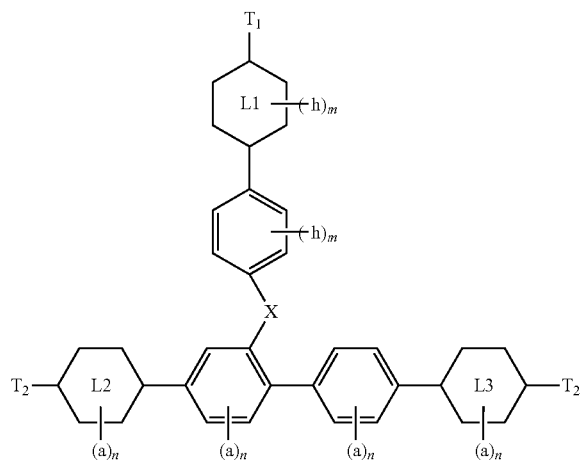

Formula 2

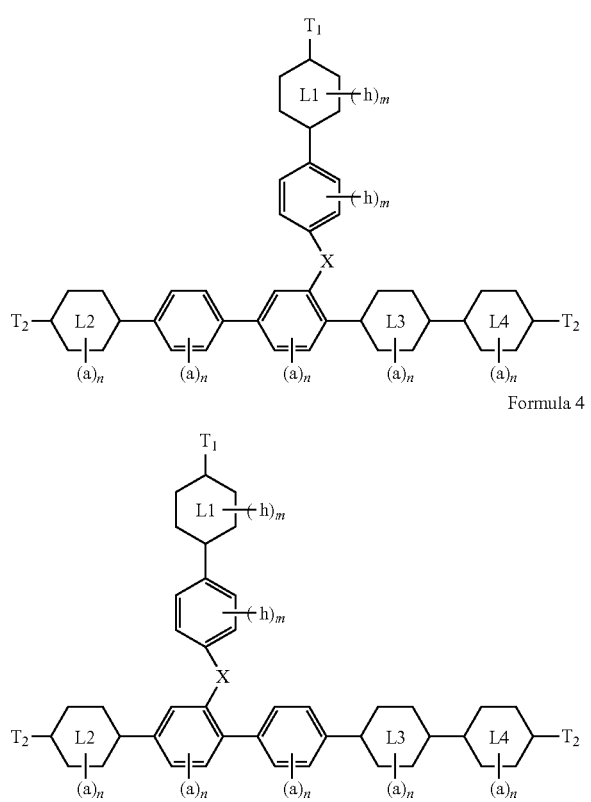

Formula 3

Formula 4 wherein, from the Formula 1 to the Formula 4, L1 represents a first six-member ring located at the non-polar portion, L2 represents a second six-member ring located at the polar portion, L3 represents a third six-member ring located at the polar portion, and L4 represents a fourth six-member ring located at the polar portion; h is a benzene ring connected with the non-polar portion or a first substituent of the first six-member ring; m is the number of the benzene ring at the same non-polar portion or the number of the first substituent of the first six-member ring; and m is an integer of 0-4;

T1 is a first end group on the first six-member ring, which comprises a carbon chain having 1 to 25 carbon atoms; the first end group is selected from one of —O—, —COO—, —OCO—, —CH$_2$O—, —OCH$_2$O—, —O(CH$_2$)$_2$O—, and —COCH$_2$—;

a is a benzene ring connected with the polar portion, or a second substituent of the second six-member ring, the third six-member ring or the fourth six-member ring; n is the number of the benzene ring at the same polar portion, or the number of the second substituent of the second six-member ring, the third six-member ring or the fourth six-member ring; n is an integer of 0-4; T2 is a benzene ring on the polar portion, or a second end group on the second six-member ring, the third six-member ring or the fourth six-member ring, which comprises a carbon chain having 1 to 25 carbon atoms; and the second end group is selected from at least one of F, Cl, Br, CN, hydroxyl, primary amino group, secondary amino group, tertiary amino group, ether group, ester group and carbonyl group;

X is the bonding group which is an ether bond or a carbon chain having 1 to 10 carbon atoms.

In the liquid crystal medium composition of the present invention, the first six-member ring, the second six-member ring, the third six-member ring or the fourth six-member ring is a benzene ring or cyclohexane.

In the liquid crystal medium composition of the present invention, the bonding group is selected from one of —O—, —COO—, —OCO—, —CH$_2$O—, —OCH$_2$O—, —O(CH$_2$)$_2$O— and —COCH$_2$—.

In the liquid crystal medium composition of the present invention, the first substituent is selected from at least one of F, Cl, Br, CN, C$_1$-C$_{10}$ linear alkyl and C$_1$-C$_{10}$ branched alkyl.

In the liquid crystal medium composition of the present invention, the second substituent is selected from at least one of F, Cl, Br, CN, hydroxyl, primary amino group, secondary amino group, tertiary amino group, ether group, ester group, carbonyl group, C1-C10 linear alkyl and C1-C10 branched alkyl.

In the liquid crystal medium composition of the present invention, the Formula 1 has a structure as given in the following formula:

Formula 5

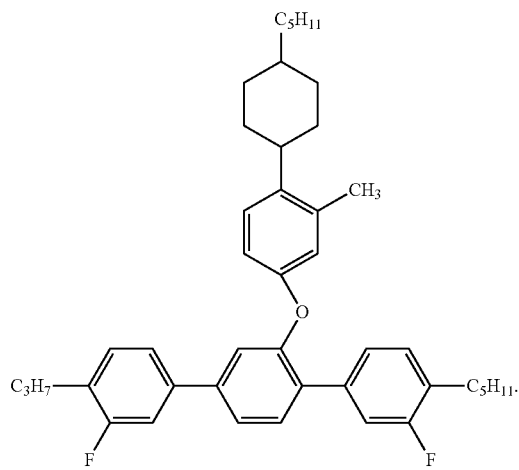

In the liquid crystal medium composition of the present invention, the Formula 2 has a structure as given in the following formula:

Formula 6

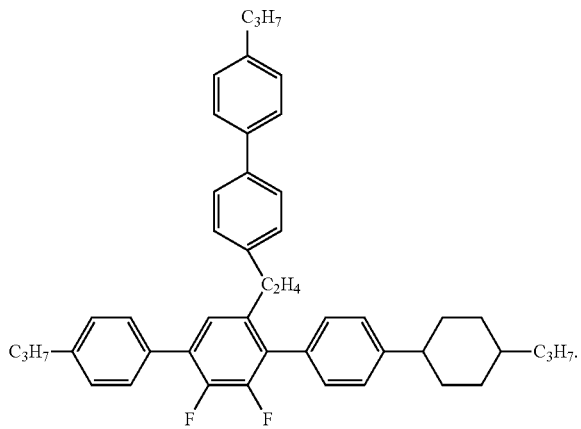

In the liquid crystal medium composition of the present invention, the Formula 3 has a structure as given in the following formula:

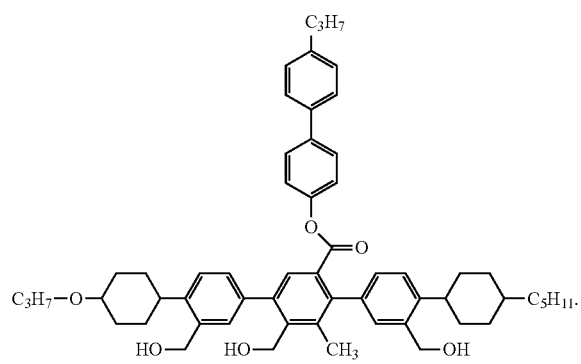

Formula 7

To solve the above problems, the present invention provides a liquid crystal medium composition, comprising:

a negative liquid crystal material; at least one polymerizable monomer which is polymerized under a UV irradiation; and at least one alignment assistant including a polar portion and a non-polar portion, wherein the polar portion is connected with the non-polar portion by a bonding group; wherein the alignment assistant has a structure as given in one of the following formulas:

Formula 1

Formula 2

Formula 3

Formula 4 wherein, in the Formula 1 to the Formula 4, L1 represents a first six-member ring located at the non-polar portion, L2 represents a second six-member ring located at the polar portion, L3 represents a third six-member ring located at the polar portion, and L4 represents a fourth six-member ring located at the polar portion; h is a benzene ring connected with the non-polar portion or a first substituent of the first six-member ring; m is the number of the benzene ring at the same non-polar portion or the number of the first substituent of the first six-member ring; and m is an integer of 0-4;

T1 is a first end group on the first six-member ring, which comprises a carbon chain having 1 to 25 carbon atoms;

a is a benzene ring connected with the polar portion, or a second substituent of the second six-member ring, the third six-member ring or the fourth six-member ring; n is the number of the benzene ring at the same polar portion, or the number of the second substituent of the second six-member ring, the third six-member ring or the fourth six-member ring; n is an integer of 0-4; and T2 is a benzene ring on the polar portion, or a second end group on the second six-member ring, the third six-member ring or the fourth six-member ring, which comprises a carbon chain having 1 to 25 carbon atoms; and X is the bonding group which is an ether bond or a carbon chain having 1 to 10 carbon atoms.

In the liquid crystal medium composition of the present invention, the first six-member ring, the second six-member ring, the third six-member ring or the fourth six-member ring is a benzene ring or cyclohexane.

In the liquid crystal medium composition of the present invention, the first end group is selected from one of —O—, —COO—, —OCO—, —CH$_2$O—, —OCH$_2$O—, —O(CH$_2$)$_2$O— and —COCH$_2$—.

In the liquid crystal medium composition of the present invention, the second end group is selected from at least one of F, Cl, Br, CN, hydroxyl, primary amino group, secondary amino group, tertiary amino group, ether group, ester group and carbonyl group.

In the liquid crystal medium composition of the present invention, the bonding group is selected from one of —O—, —COO—, —OCO—, —CH$_2$O—, —OCH$_2$O—, —O(CH$_2$)$_2$O— and —COCH$_2$—.

In the liquid crystal medium composition of the present invention, the first substituent is selected from at least one of F, Cl, Br, CN, $C_1$-$C_{10}$ linear alkyl and $C_1$-$C_{10}$ branched alkyl.

In the liquid crystal medium composition of the present invention, the second substituent is selected from at least one of F, Cl, Br, CN, hydroxyl, primary amino group, secondary amino group, tertiary amino group, ether group, ester group, carbonyl group, $C_1$-$C_{10}$ linear alkyl and $C_1$-$C_{10}$ branched alkyl.

In the liquid crystal medium composition of the present invention, the Formula 1 has a structure as given in the following formula:

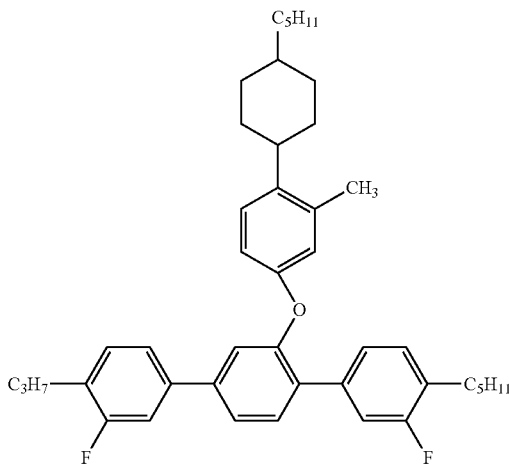

Formula 5

In the liquid crystal medium composition of the present invention, the Formula 2 has a structure as given in the following formula:

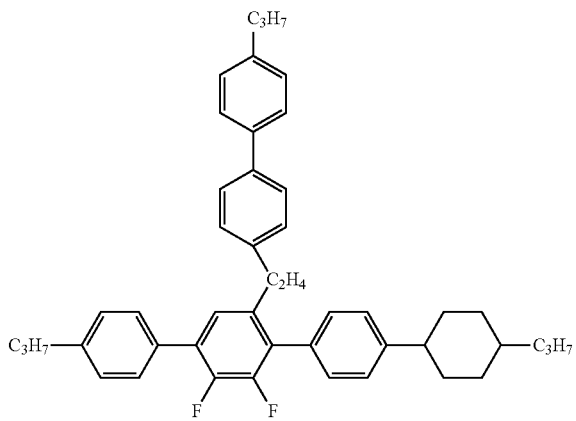

Formula 6

In the liquid crystal medium composition of the present invention, the Formula 3 has a structure as given in the following formula:

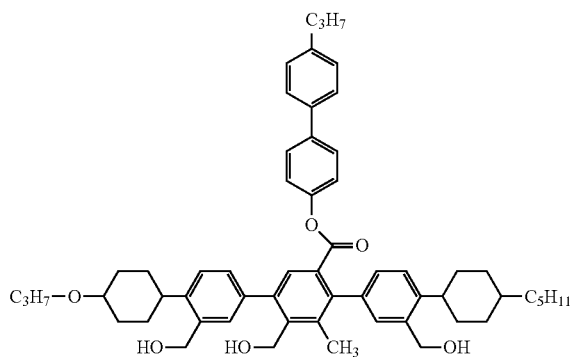

Formula 7

The liquid crystal medium composition according to the present invention can achieve the vertical alignment without the PI alignment layer by improving the liquid crystal material, simplify the structure and the manufacturing process of the liquid crystal display panel, reduce energy consumption and contamination, lower the producing cost, and further promote the display effect.

DETAILED DESCRIPTION OF THE PREFERRED EMBODIMENTS

Figure 1:
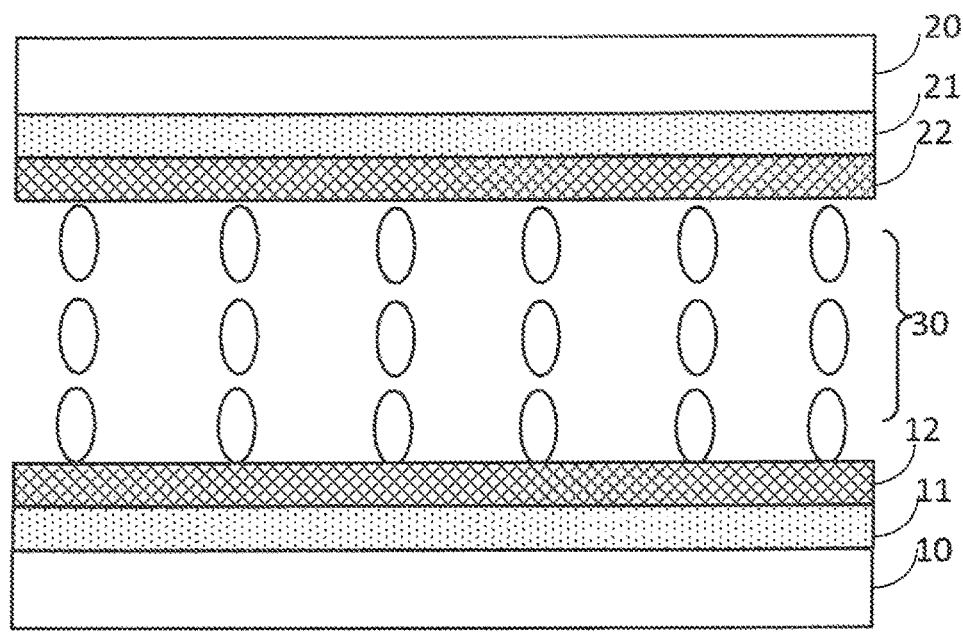
FIG. 1 is a schematic view of a traditional liquid crystal display panel.

The detailed description of the following embodiments is used for exemplifying the specific embodiments of the present invention by referring to the accompany drawings. Furthermore, directional terms described by the present invention, such as upper, lower, front, back, left, right, inner, outer, side, etc., are only directions by referring to the accompanying drawings, and thus the directional terms are used to describe and understand the present invention, but the present invention is not limited thereto. In the figures, the units having similar structure are represented by the same reference numerals.

The present invention provides a liquid crystal medium composition comprising: a negative liquid crystal material; at least one polymerizable monomer which is polymerized under a UV irradiation; and at least one alignment assistant. The alignment assistant includes a polar portion and a non-polar portion. The polar portion (lateral portions in Formula 1 to 4) is connected with the non-polar portion (vertical portions in Formula 1 to 4) by a bonding group. The alignment assistant has a structure as given in one of the following formulas:

Formula 1

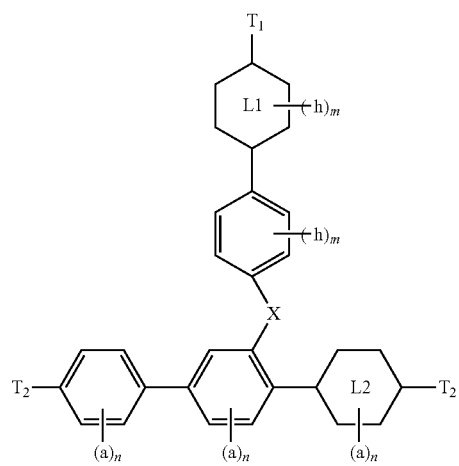

Formula 2

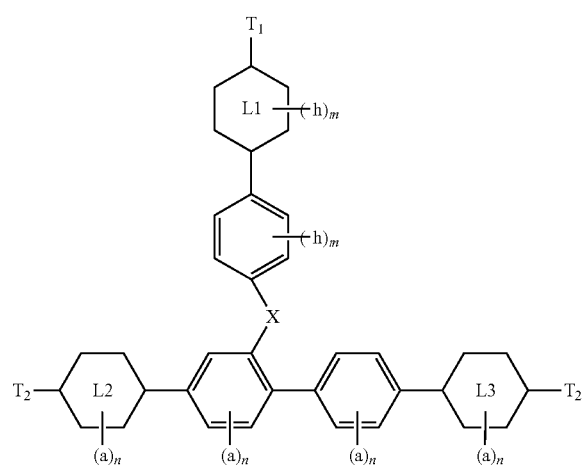

Formula 3

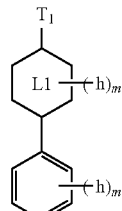

Formula 4

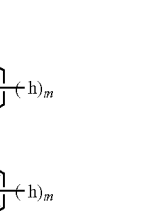

In above Formula 1 to Formula 4, L1 represents a first six-member ring located at the non-polar portion, L2 represents a second six-member ring located at the polar portion, L3 represents a third six-member ring located at the polar portion, L4 represents a fourth six-member ring located at the polar portion; h is a benzene ring connected with the non-polar portion or a first substituent of the first six-member ring, m is the number of the benzene ring at the same non-polar portion or the number of the first substituent of the first six-member ring, and m is an integer of 0-4; and the first substituent can be selected from at least one of F, Cl, Br, CN, $C_1$-$C_{10}$ linear alkyl, and $C_1$-$C_{10}$ branched alkyl.

T1 is a first end group on the first six-member ring, which comprises a carbon chain having 1 to 25 carbon atoms; and the first end group can be selected from one of —O—, —COO—, —OCO—, —CH$_2$O—, —OCH$_2$O—, —O(CH$_2$)$_2$O—, and —COCH$_2$—.

a is a benzene ring connected with the polar portion or a second substituent of the second six-member ring, the third six-member ring or the fourth six-member ring, n is the number of the benzene ring at the same polar portion or the number of the second substituent of the second six-member ring, the third six-member ring or the fourth six-member ring, and n is an integer of 0-4; T2 is a benzene ring on the polar portion or a second end group on the second six-member ring, the third six-member ring or the fourth six-member ring, which comprises a carbon chain having 1 to 25 carbon atoms; the second end group can be selected from at least one of F, Cl, Br, CN, hydroxyl, primary amino group, secondary amino group, tertiary amino group, ether group, ester group, and carbonyl group. The second substituent can be selected from at least one of F, Cl, Br, CN, hydroxyl, primary amino group, secondary amino group, tertiary amino group, ether group, ester group, carbonyl group, $C_1$-$C_{10}$ linear alkyl, and $C_1$-$C_{10}$ branched alkyl.

X is the bonding group which is an ether bond or a carbon chain having 1 to 10 carbon atoms. The bonding group can be selected from one of —O—, —COO—, —OCO—, —CH$_2$O—, —OCH$_2$O—, —O(CH$_2$)$_2$O—, and —COCH$_2$—.

At least one substituent of the six-member ring within the polar portion is a polar group, and a substituent of the six-member ring within the non-polar portion is a non-polar group.

The number of the first substituent of each benzene ring or cyclohexane in the non-polar portion as shown in any of the abovementioned molecular formulas can be the same or different. The number of the second substituent of each benzene ring or cyclohexane in the polar portion as shown in any of the abovementioned molecular formulas can be the same or different.

Preferably, the Formula 1 has a structure as given in the following formula:

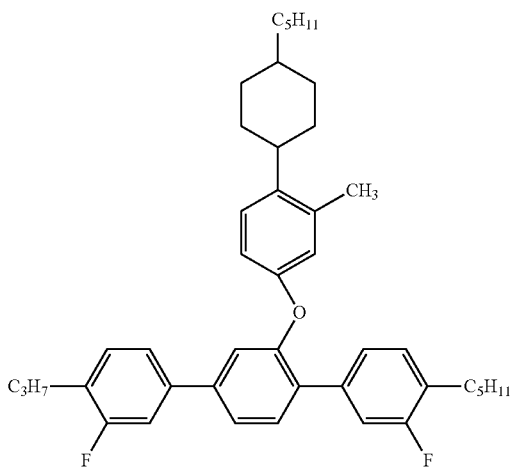

Formula 5

The Formula 2 has a structure as given in the following formula:

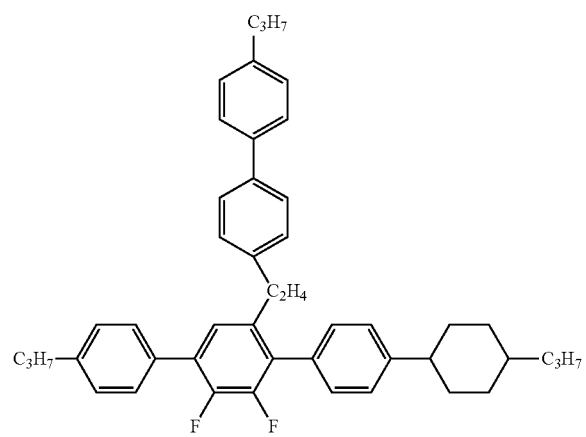

Formula 6

The Formula 3 has a structure as given in the following formula:

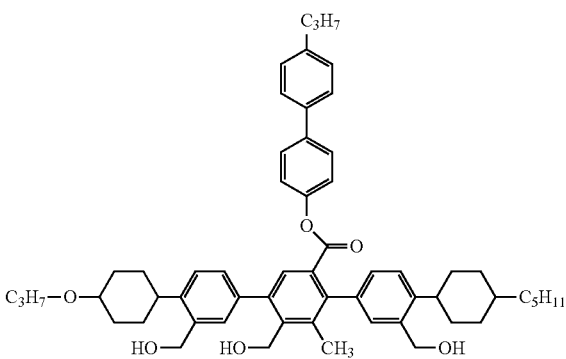

Formula 7

The Formula 4 has a structure as given in the following formula:

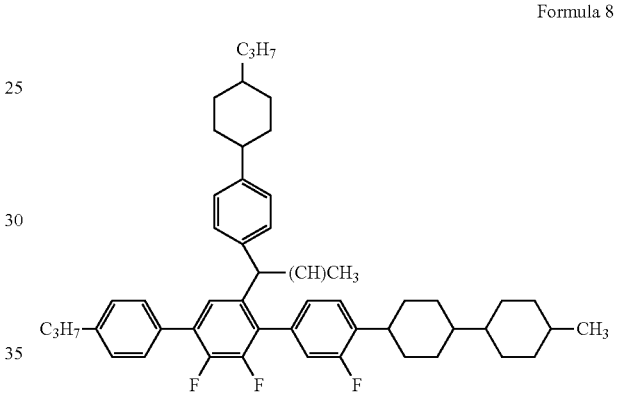

Formula 8

Figure 2:
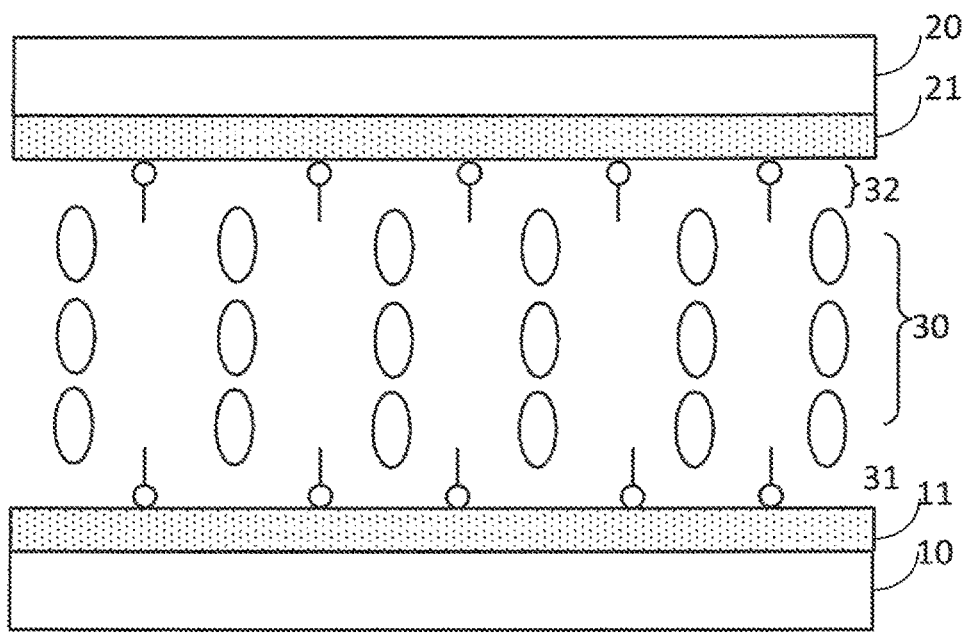
FIG. 2 is a schematic view of a liquid crystal display panel according to the present invention.

As shown in FIG. 2, FIG. 2 is a liquid crystal display panel according to the present invention. The liquid crystal display panel comprises a first substrate 10, a second substrate 20, a liquid crystal layer 30. The first substrate 10 has a first transparent electrode layer 11 disposed thereon, and the second substrate 20 has a second transparent electrode layer 21 disposed thereon. The inner sides of the first substrate 10 and second substrate 20 respectively have a first alignment structure 31 and a second alignment structure 32 formed thereon. The first substrate 10 can be an array substrate, and the second substrate 20 can be a color filter substrate.

The first alignment structure and the second alignment structure can be obtained by the following steps.

When the alignment assistant is added to liquid crystal molecules, since the alignment assistant has the polar group and the non-polar group, the polar group will react with the first substrate and the second substrate, and the non-polar group will react with the liquid crystal molecules, so that the liquid crystal molecules can be arranged perpendicularly to the surfaces of the first substrate and the second substrate of the liquid crystal display panel without an alignment layer. Because the alignment assistant is utilized by directly mixing with the liquid crystal molecules without using solvent to dissolve them together, the equipment used for coating a traditional alignment agent and baking at high temperature can be omitted. Furthermore, the additional solvent is not necessary, and thus the present invention has advantages of more environmentally friendly, energy conservation, and lower cost of production.

The liquid crystal medium composition according to the present invention can achieve the vertical alignment without the PI alignment layer by improving the liquid crystal material, simplify the structure and the manufacturing process of the liquid crystal display panel, reduce energy consumption and contamination, lower the producing cost, and further promote the display effect.

The present invention has been described with preferred embodiments thereof and it is understood that many changes and modifications to the described embodiments can be carried out without departing from the scope and the spirit of the invention that is intended to be limited only by the appended claims.

What is claimed is:

1. A liquid crystal medium composition, comprising:
a negative liquid crystal material;
at least one polymerizable monomer which is polymerized under a UV irradiation; and
at least one alignment assistant including a polar portion and a non-polar portion,
wherein the polar portion is connected with the non-polar portion by a bonding group;
wherein the alignment assistant has a structure as given in one of the following formulas:

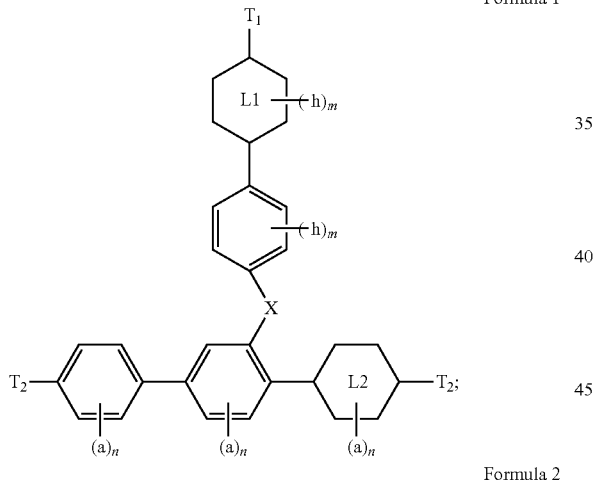

Formula 1

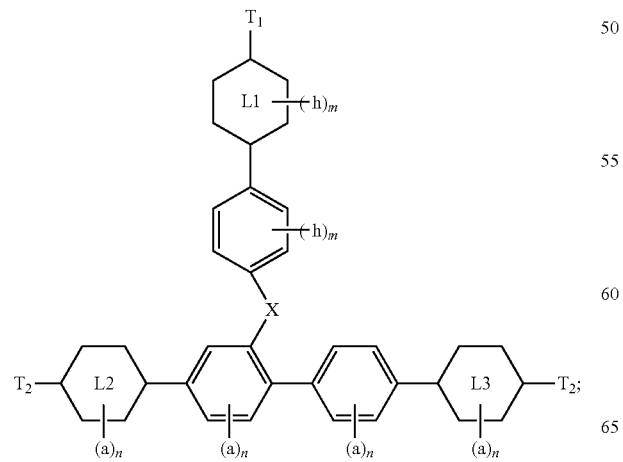

Formula 2

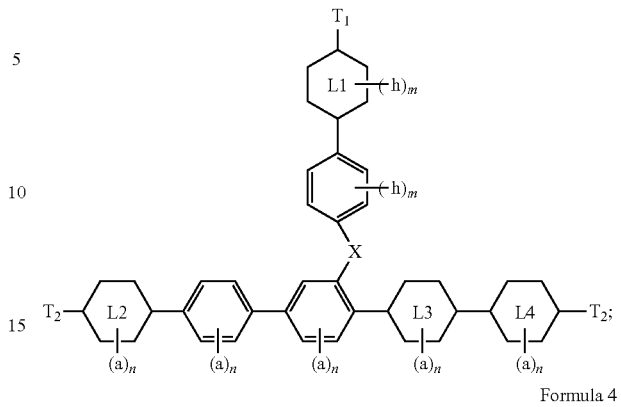

Formula 3, Formula 4 wherein, L1 represents a first six-member ring located at the non-polar portion, L2 represents a second six-member ring located at the polar portion, L3 represents a third six-member ring located at the polar portion, and L4 represents a fourth six-member ring located at the polar portion; h is a benzene ring connected with the non-polar portion or a first substituent of the first six-member ring; in is the number of the benzene ring at the same non-polar portion or the number of the first substituent of the first six-member ring; and m is an integer of 0-4;

wherein T1 is a first end group on the first six-member ring, which is an alkyl group or an oxygen containing group having 1 to 25 carbon atoms; the oxygen-containing group having an oxygen-containing bonding is selected from the group consisting of —O—, —COO—, —OCO—, —CH$_2$O—, —OCH$_2$O—, —O(CH$_2$)$_2$O— and —COCH$_2$—;

wherein a is a benzene ring connected with the polar portion, or a second substituent of the second six-member ring, the third six-member ring or the fourth six-member ring; n is the number of the benzene ring at the same polar portion, or the number of the second substituent of the second six-member ring, the third six-member ring or the fourth six-member ring; and n is an integer of 0-4;

wherein T2 is a benzene ring on the polar portion, or a second end group on the second six-member ring; the third six-member ring or the fourth six-member ring, which is selected from the group consisting of an alkyl group or an oxygen-containing group having 1 to 25 carbon atoms, F, Cl, Br, CN, hydroxyl, primary amino group, secondary amino group, tertiary amino group, ether group, ester group and carbonyl group; and wherein X is the bonding group which is selected from the group consisting of an ether bond, a alkylene group having 1 to 10 carbon atoms —O—, —COO—, —OCO—, —CH$_2$O—, —OCH$_2$O—, —O(CH$_2$)$_2$O— and —COCH$_2$—.

2. The liquid crystal medium composition according to claim 1, wherein the first six-member ring, the second six-member ring, the third six-member ring or the fourth six-member ring is a benzene ring or cyclohexane.

3. The liquid crystal medium composition according to claim 1, wherein the first substituent is selected from the group consisting of F, Cl, Br, CN, C$_1$-C$_{10}$ linear alkyl or and C$_1$-C$_{10}$ branched alkyl.

4. The liquid crystal medium composition according to claim 1, wherein the second substituent is selected from the group consisting of F, Cl, Br, CN, hydroxyl, primary amino group, secondary amino group, tertiary amino group, ether group, ester group, carbonyl group, C$_1$-C$_{10}$ linear alkyl and C$_1$-C$_{10}$ branched alkyl.

5. The liquid crystal medium composition according to claim 1, wherein the Formula 1 has a structure as given in the following formula:

Formula 5

6. The liquid crystal medium composition according to claim 1, the formula 2 has a structure as given in the following formula:

Formula 6

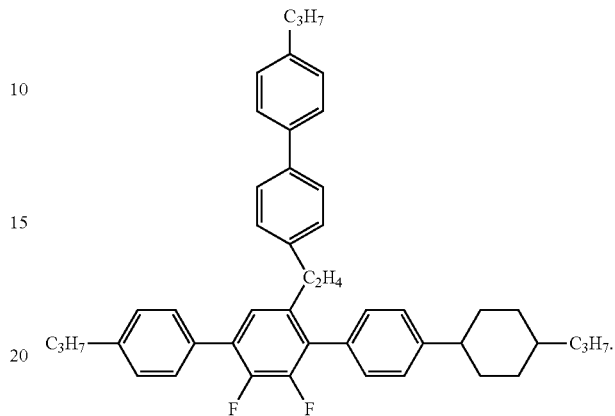

7. The liquid crystal medium composition according to claim 1, the Formula 3 has a structure as given in the following formula:

Formula 7

* * * * *